US009182169B2

(12) United States Patent
Stahl et al.

(10) Patent No.: US 9,182,169 B2
(45) Date of Patent: Nov. 10, 2015

(54) DEVICE AND METHOD FOR THE PRODUCTION OF COOLED COFFEE

(75) Inventors: Stefan Stahl, Berikon (CH); Mariano Turi, Zürich (CH); Heinz Vetterli, Wangen (CH)

(73) Assignee: FRANKE KAFFEEMASCHINEN AG, Aarburg (CH)

( * ) Notice: Subject to any disclaimer, the term of this patent is extended or adjusted under 35 U.S.C. 154(b) by 509 days.

(21) Appl. No.: 12/836,824

(22) Filed: Jul. 15, 2010

(65) Prior Publication Data

US 2011/0014339 A1 Jan. 20, 2011

(30) Foreign Application Priority Data

Jul. 15, 2009 (DE) .......................... 10 2009 033 507

(51) Int. Cl.
*A47J 31/057* (2006.01)
*A47J 31/44* (2006.01)
*F25D 31/00* (2006.01)

(52) U.S. Cl.
CPC .............. *F25D 31/005* (2013.01); *A47J 31/44* (2013.01)

(58) Field of Classification Search
CPC ...... F25D 2400/28; F25D 31/002; A01J 9/04; A23V 2002/00; A23V 2200/10; A23V 2200/3262; A23V 2250/214; A23V 2250/28; A23V 2250/708; B67D 1/0857; B67D 1/0865; B67D 1/0067; B67D 1/0867; B67D 3/0009
See application file for complete search history.

(56) References Cited

U.S. PATENT DOCUMENTS 5,435,155 A * 7/1995 Paradis ............................ 62/515
5,724,883 A * 3/1998 Usherovich ..................... 99/290

(Continued)

FOREIGN PATENT DOCUMENTS

WO 2008061726 5/2008

OTHER PUBLICATIONS

Stutz et al., WO 2009/132742, Nov. 5, 2009, English Machine Translated.*

(Continued)

*Primary Examiner* — Michele Jacobson
*Assistant Examiner* — Hong T Yoo
(74) *Attorney, Agent, or Firm* — Volpe and Koenig, P.C.

(57) ABSTRACT

The invention relates to a device (1, 10) for the production of cooled coffee, comprising a brewing unit (4) for the production of coffee, a cooling assembly (11) and a coffee cooler (14) formed as a heat exchanger, wherein the coffee cooler (14) has at least one first and one second flow path that are connected thermally but not in a fluid-conducting manner, wherein a coolant can flow through the first flow path and the second flow path is connected in a fluid-conducting manner with a coffee outlet (5) of the brewing unit (4). It is essential that the device furthermore has a fresh-water supply (2) and a fresh-water cooler (13) formed as an additional heat exchanger, wherein the fresh-water cooler (13) has at least one first and one second flow path that are connected thermally but not in a fluid conducting manner and the fresh-water supply (2) is connected in a fluid-conducting manner downstream with the second flow path of the fresh-water cooler (13), further downstream with the first flow path of the coffee cooler (14), and further downstream with the brewing unit (4) and the first flow path of the fresh-water cooler (13) is connected in a fluid-conducting manner with a coolant circuit of the cooling assembly. The invention further relates to a method for the production of cooled coffee.

15 Claims, 1 Drawing Sheet

(56) References Cited

U.S. PATENT DOCUMENTS

2001/0050004 A1* 12/2001 Ugolini ............................ 99/275
2006/0005712 A1* 1/2006 Greenwald et al. ............. 99/275
2006/0112831 A1* 6/2006 Greenwald et al. ............. 99/275
2010/0260907 A1* 10/2010 Buchholz et al. ............. 426/433
2011/0045152 A1* 2/2011 Stutz et al. .................... 426/433

OTHER PUBLICATIONS

WO 96/38078, Fiedos et al. Jun. 6, 1996.*

* cited by examiner

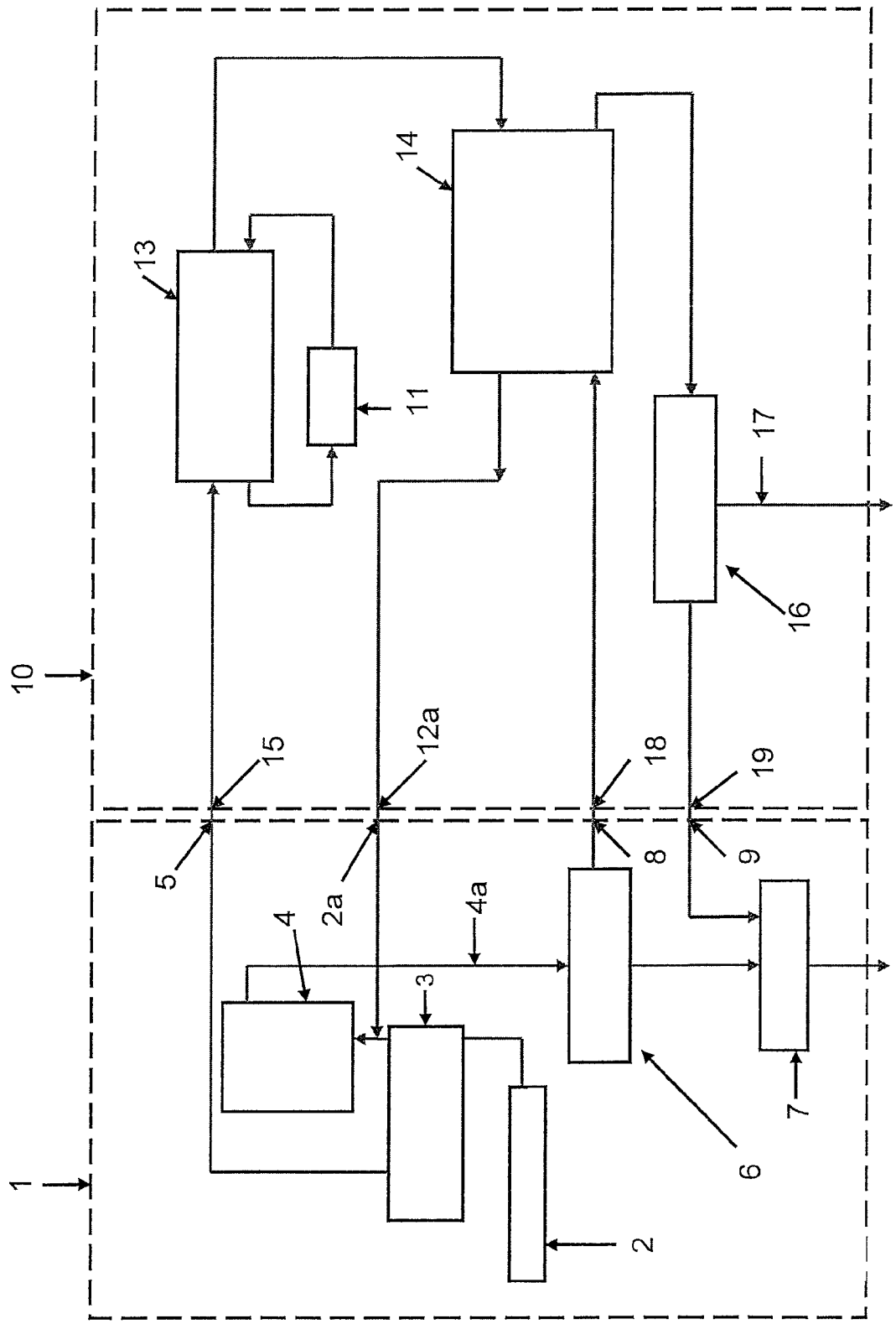

DEVICE AND METHOD FOR THE PRODUCTION OF COOLED COFFEE

The invention relates to a device for the production of cooled coffee according to claims 1 and 10.

The consumption of coffee produced by means of brewing units enjoys great popularity in gourmet and private circles. Here, mixed drinks using coffee are being made more and more, for example, with the addition of milk foam and/or other flavoring agents, such as syrup. In particular, on hot days or for the production of special mixed drinks, the use of cooled coffee is often desired. Here it is typical to brew coffee in large quantities and then to cool it over a long time period or to allow it to cool in the surrounding air.

Furthermore, the use of heat exchangers for cooling coffee is known; for example, WO 2008/061726 describes a device in which a portion of the coffee is collected in a collection container after its preparation and is then conducted by means of a pump several times through a heat exchanger. Here, the heat exchanger has two flow paths that are arranged in a fluid-tight way and in geometrically and thermally close contact. The coffee here passes through one flow path and a cooling circuit of a compressor cooling assembly passes through the other flow path of the heat exchanger.

Often, however, there is the desire to produce freshly brewed cold coffee in a short time. In addition, for brewing the coffee on one hand a large quantity of energy is needed for heating the water and on the other hand a large quantity of energy is needed for the cooling process, in particular, by means of a compressor.

The present invention is therefore based on the problem of creating a device and a method by means of which freshly brewed coffee can be produced quickly when desired. In addition, energy savings should be achieved for the production of freshly brewed, cooled coffee. Furthermore, the setting of an output temperature of the cooled coffee should be possible, for example, independent of the temperature of the water fed into the brewing unit.

This problem is solved by a device according to claim 1 and a method according to claim 10. Advantageous constructions of the device according to the invention are found in claims 2 to 9 and the method according to the invention in claims 11 to 15.

The device according to the invention for the production of cooled coffee comprises a brewing unit for the production of coffee, a cooling assembly, and a coffee cooler constructed as a heat exchanger. The coffee cooler has at least one first and one second flow path. The two flow paths are connected thermally, but not in a fluid-conducting manner.

A coolant can flow through the first flow path and the second flow path is connected in a fluid-conducting manner with a coffee outlet of the brewing unit. Freshly brewed coffee from the brewing unit can thus be conducted via the coffee outlet through the second flow path and can be cooled by heat transfer with a coolant guided through the first flow path.

It is essential that the device further comprise a fresh-water supply and a fresh-water cooler constructed as an additional heat exchanger. Like the coffee cooler, the fresh-water cooler also has at least one first and one second flow path, wherein the two flow paths are connected thermally, but not in a fluid-conducting manner.

The fresh-water supply is connected in a fluid-conducting manner downstream with the second flow path of the fresh-water cooler, farther downstream with the first flow path of the coffee cooler, and further downstream with the brewing unit. The first flow path of the fresh-water cooler is connected in a fluid-conducting manner with a coolant circuit of the cooling assembly.

The designations "downstream" and "connected in a fluid-conducting manner" here include additional intermediate elements being optionally arranged in the flow path.

In contrast to the state of the art, the device according to the invention thus has a fresh-water cooler in addition to the coffee cooler. The fresh water is cooled by means of the fresh-water cooler and the cooling assembly. The cooled fresh water flows through the first flow path of the coffee cooler, so that, with respect to the coffee cooler, the cooled fresh water acts as a coolant. Due to the heat transfer, the coffee is thus cooled in the coffee cooler and the fresh water is, in turn, heated. The fresh water heated in this way is fed to the brewing unit, in order to produce coffee by means of brewing, wherein this coffee is then cooled as described before.

The device according to the invention thus has the advantage that freshly brewed coffee is cooled in the coffee cooler and can be discharged directly, so that freshly brewed, cooled coffee is produced. In particular, in comparison with the prior art, multiple recirculation of the produced coffee between a storage vessel and heat exchanger is not necessary, because cooling of the coffee by means of the fresh water cooled by the fresh-water cooler is sufficient for only one passage through the coffee cooler. In this way, furthermore, the direct output of the freshly brewed, cooled coffee is possible after one passage of the coffee cooler, so that freshly brewed, cooled coffee is available immediately when desired with a preparation time that corresponds approximately to the preparation time for freshly brewed, hot coffee.

In addition, the dissipated heat of the coffee to be cooled is used for heating the fresh water and the fresh water heated in this way is fed to the brewing unit, where it is further heated and used for brewing coffee. The dissipated heat when the coffee is cooled is thus at least partially used for heating or pre-heating the fresh water, so that energy is saved.

The device advantageously comprises a coffee outlet by means of which the cooled coffee is output into a container, such as, for example, a cup.

For a sufficient cooling effect in the coffee cooler, the fresh-water cooler and the cooling assembly are advantageously constructed so that, after flowing through the fresh-water cooler, the fresh water is cooled to a temperature below 7° C., advantageously below 4° C., preferably to a temperature in the range of 1° C. to 3° C. This end temperature is advantageously achieved independent of the output temperature of the fresh water, at least for a typical output temperature of the fresh water in the range between 15° C. and 30° C. This can be guaranteed on one hand by a controller and corresponding temperature sensor. However, it is especially simple and economical to dimension and construct the fresh-water cooler and cooling assembly such that, without an active controller, the set end temperature of the fresh water is achieved at least in the temperature regions described above as advantageous.

For achieving a sufficient cooling effect, it is thus advantageous to significantly cool the fresh water by means of the fresh-water cooler. Here there is the risk that the fresh water freezes. In the scope of the invention, as already mentioned from the prior art, to provide an electrical additional heater through which freezing is prevented advantageously by means of temperature sensors and a corresponding controller. However it is especially advantageous to construct the fresh-water cooler and the cooling assembly such that the fresh-water cooler has an evaporation temperature >0° C. Here, complicated electrical heating and corresponding regulation can be eliminated and freezing of the fresh water is effectively prevented.

Advantageously, for the fresh-water cooler, a thermal buffer element is arranged between the first and second flow path. This is advantageously a metallic element with high heat capacity, in particular, a buffer element made from copper, such as, for example, a copper plate. The buffer element acts against a fast temperature change due to its thermal mass and thus limits possible temperature fluctuations. In this way, a more uniform output temperature of the fresh water is achieved and also freezing of the fresh water is prevented.

For devices for producing coffee, the cleaning represents an important aspect. In particular, for devices used in the public food production industry, regular cleaning cycles are absolutely necessary. It is especially advantageous when the cleaning is performed automatically or only with minimal effort by a user.

In another advantageous embodiment of the device according to the invention, this therefore has a cleaning multi-port directional control valve that can be connected in a fluid-conducting manner at least to a coffee outlet and to a cleaning outlet. Via the coffee outlet, the coffee is output into a container, for example, a cup, while the cleaning outlet opens into a collection container or an outflow. The coffee outlet of the brewing unit is here connected downstream with the cleaning multi-port directional control valve. In this way, fluid can be output downstream of the second flow path of the coffee cooler via the coffee outlet or via the cleaning outlet.

For this advantageous embodiment, it is thus possible to start a cleaning cycle that cleans parts and/or all of the flow paths of the device, wherein, however, through corresponding control of the cleaning multi-port directional control valve, the fluid used for cleaning is not output to the coffee outlet, but instead (not visible for the user) via the cleaning outlet into a collection container or directly into the drain. Thus, when performing a cleaning cycle, the user does not have to place a collection container under the coffee outlet. In particular, if the cleaning outlet is connected directly to a drain, a completely automatic execution of a cleaning cycle is possible, without action being required of the user. For example, such a cleaning cycle could be performed at fixed time intervals or as a function of a specified amount of produced coffee.

Advantageously, the cleaning cycle is performed completely automatically by means of the control by a control unit that also controls, among other things, the cleaning multi-port directional control valve. Likewise, the use of cleaning agents already known in the prior art and several successive cleaning cycles and optional rinsing processes lie in the scope of the invention.

The cleaning is performed advantageously alternately and, in particular, advantageously additionally by means of blowing compressed air through the lines. Here, a quick cleaning of the line paths is achieved and, in addition, no cleaning fluid remains in the lines after the cleaning. In particular, it is advantageous to clean at least the line paths of the coffee by means of compressed air after each coffee production process. Advantageously, the output for this cleaning is performed by mean of the cleaning outlet.

Advantageously, the device is constructed such that freshly brewed hot coffee or freshly brewed cooled coffee is produced selectively.

In one advantageous embodiment, the device according to the invention therefore has a fresh-water multi-port directional control valve that is arranged between the fresh-water supply and second flow path of the fresh-water cooler. By means of the fresh-water multi-port directional control valve, the fresh-water supply can be connected in a fluid-conducting manner selectively to the second flow path of the fresh-water cooler and further as described above or can be connected in a fluid-conducting manner with the brewing unit while bypassing the second flow path of the fresh-water cooler and while bypassing the first flow path of the coffee cooler.

By means of the fresh-water multi-port directional control valve, it can thus be specified whether the fresh water passes through the two coolers or does not pass through these coolers into the brewing unit. The former is performed as described for the production of cooled coffee, the latter is performed for the production of hot coffee.

Alternatively and/or additionally it is advantageous that the device comprises a coffee multi-port directional control valve that is arranged between the coffee outlet of the brewing unit and the second flow path of the coffee cooler. By means of the coffee multi-port valve, the coffee outlet of the brewing unit can be connected in a fluid-conducting manner selectively with the second flow path of the coffee cooler or with a coffee outlet for the output of the coffee into a container while bypassing the second flow path of the coffee cooler. In this way it is thus possible, for the production of hot coffee, to conduct the coffee produced by means of the brewing unit to the coffee outlet while bypassing the coffee cooler and, in contrast, for the production of cold coffee as described above to conduct the hot coffee produced by the brewing unit to a coffee outlet via the second flow path of the coffee cooler.

The device according to the invention can be integrated into the previously known devices for the production of coffee, in particular, into so-called "coffeemakers."

It is especially advantageous to construct the device according to the invention in two structural units. The first structural unit here corresponds to a previously known device for the production of coffee, comprising a fresh-water supply, a brewing unit, as well as a coffee outlet. The fresh-water supply is connected in a fluid-conducting manner downstream with the brewing unit and this downstream with the coffee outlet. It is essential that a fresh-water multi-port directional control valve as described above is arranged between the fresh-water supply and the brewing unit, by means of which fresh-water valve the fresh water can be conducted selectively to a fresh-water output of the first unit or to the brewing unit. The first brewing unit furthermore has an input for cooled fresh water that is connected in a fluid-conducting manner to the brewing unit. Furthermore, the first structural unit has a coffee multi-port directional control valve described as before, by means of which the coffee produced by the brewing unit can be conducted selectively to a coffee output of the first unit or to the coffee outlet. Furthermore, the first unit has a coffee inlet that is connected in a fluid-conducting manner to the coffee outlet.

The second unit comprises a fresh-water input that is connected in a fluid-conducting manner to the fresh-water output of the first structural unit. The fresh-water input is connected in a fluid-conducting manner downstream with the second flow path of the fresh-water cooler, further downstream with the first flow path of the coffee cooler, and finally with a fresh-water output of the second unit. The fresh-water output of the second unit is connected, in turn, in a fluid-conducting manner to the fresh-water input of the first unit.

The second unit further comprises a coffee input that is connected in a fluid-conducting manner to the coffee output of the first unit and downstream with the second flow path of the coffee cooler and further downstream with a coffee output of the second unit, optionally with the intermediate connection of a cleaning multi-port directional control valve described as above. The coffee output of the second unit is connected to the coffee input of the first unit.

The second unit further comprises the cooling assembly whose coolant circuit is connected in a fluid-conducting manner to the first flow path of the fresh-water cooler.

Both units are advantageously constructed as standalone units, in particular, each in a housing and each advantageously have the necessary supply fittings, such as, for example, electrical connections and optionally required control units and control connections.

This configuration produces the advantage that the first unit can be used as a complete coffeemaker and also can be equipped, when needed, with the second unit that can be purchased separately, for example, at a later time, so that freshly brewed cold coffee can also be produced with both units together.

As described above, coffee mixed drinks are often produced, for example, under the addition of another fluid foodstuff, such as, for example, milk or syrup. Here it is known that devices for the production of coffee comprise a cooling chamber for cooling a fluid foodstuff that is cooled by means of a cooling assembly. For example, integrated milk coolers or milk coolers as accessory equipment are known that comprise, in addition to the corresponding devices for cooling the stored milk, conveying means, such as, for example, pumps, in order to output milk when desired optionally with additional processing, such as, for example, foaming.

In one advantageous embodiment, the device according to the invention therefore comprises a cooling chamber for cooling a fluid foodstuff, wherein the coolant circuit of the cooling assembly is connected thermally with the cooling chamber and is constructed such that, by means of the coolant, both the cooling chamber and also the first flow path of the fresh-water cooler can be cooled. Here, through the use of only one cooling assembly, both the fluid foodstuff in the cooling chamber and also the fresh water are cooled. This allows a cost-saving production and an energy-saving use.

It is especially advantageous that the coolant circuit of the cooling assembly is connected in a fluid-conducting manner to at least two evaporators, wherein starting from a compressor this is connected in a fluid-conducting manner in the coolant circuit downstream with a condenser, further downstream with a first evaporator for cooling the cooling chamber, and further downstream with the first flow path of the fresh-water cooler as the second evaporator. This is based on the fact that typically with respect to the cooling of the cooling chamber, a lower temperature of the coolant is advantageous compared with the coolant temperature for an optimal cooling of the fresh water while avoiding freezing of the fresh water.

In particular, it is therefore advantageous that the first evaporator has an evaporation temperature below 0° C. and/or the second evaporator has an evaporator temperature above 0° C.

The invention further relates to a method for the production of cooled coffee according to claim 10. The method comprises the following processing steps: hot coffee is produced in a brewing unit. The coffee is cooled by means of a coffee cooler constructed as a heat exchanger and a cooling assembly.

It is essential that fresh water is cooled by means of the cooling assembly and the cooled fresh water is conducted through a first flow path of the coffee cooler and the coffee is conducted through a second flow path of the coffee cooler, wherein the first and second flow paths are connected thermally but not in a fluid-conducting manner. The fresh water is conducted downstream of the coffee cooler to the brewing unit for the production of coffee from the fresh water. For the method according to the invention, thus the coffee is cooled via the cooled fresh water indirectly by the cooling assembly.

Advantageously, the method according to the invention is constructed on a device according to the invention, in particular, according to at least one of claims 1 to 9. Advantageously, the fresh water is cooled by means of a fresh-water cooler constructed as an additional heat exchanger, wherein a coolant circuit is realized between the cooling assembly and a first flow path of the fresh-water cooler and downstream of a fresh-water supply the fresh water is conducted through a second flow path of the fresh-water cooler. The first and second flow paths are here connected thermally, but not in a fluid-conducting manner.

In another advantageous embodiment of the method according to the invention, the fresh water is cooled to a temperature below 7° C., advantageously below 4° C., preferably to a temperature in the range from 1 to 3° C. after flowing through the fresh-water cooler for an arbitrary output temperature of the fresh water in the range between 15° C. and 30° C.

Advantageously, for cleaning, the second flow path of the coffee cooler is connected in a fluid-conducting manner to a cleaning outlet and for coffee output, the second flow path of the coffee cooler is connected in a fluid-conducting manner to a coffee outlet.

For the production of cooled coffee, undesired fluid can appear from the coffee outlet immediately after starting the process. This can be due to the fact that cleaning fluid and/or water is still in the lines of the devices and/or that coffee is indeed already at the coffee outlet, but this does not yet have the desired brewing quality or not yet the desired temperature.

In one advantageous construction of the method according to the invention, for the output of coffee, initially for a predetermined time period the second flow path of the coffee cooler is connected in a fluid-conducting manner to a cleaning outlet and then to a coffee outlet. In this way, the undesired fluid is disposed of via the cleaning outlet unnoticed by the user. Advantageously, when brewing coffee, output is initially performed via the cleaning outlet, advantageously for a time period in the range between 2 s and 30 s, in particular, in the range between 5 s and 15 s. In this way it is guaranteed that, on one hand, the user does not have to wait too long for the cooled coffee and, on the other hand, sufficient rinsing or output of remaining rinsing fluid or coffee from previous coffee-production processes into the cleaning outlet is realized.

The device according to the invention and the method according to the invention are advantageously constructed such that freshly brewed, cooled coffee is output with a temperature of approximately 10° C. This temperature is recommended as particularly pleasant.

In particular, it is advantageous when the device according to the invention comprises a control unit by means of which a desired mixed drink can be specified and the control unit controls the device, in particular, the cooling assembly, such that the final temperature of the mixed drink lies at approximately 10° C.

The fresh-water cooler and/or the coffee cooler are advantageously constructed from copper, because copper is harmless with respect to foodstuff and features very good heat conductivity. The cooling assembly advantageously has a cooling compressor with an output above 150 W, advantageously above 180 W, in particular, approximately 200 W, in order to achieve sufficient cooling effect.

For the device according to the invention it is essential that the coffee is cooled sufficiently after flowing through the second flow path of the coffee cooler and has the specified temperature. Advantageously, the coffee cooler is constructed such that at least the second flow path of the coffee cooler has the lowest possible volume with which sufficient cooling is guaranteed. This produces the advantage that, on one hand, sufficient cooling is guaranteed and, on the other hand, the liquid volume that remains in the cooler after preparation of coffee is as small as possible and thus the cleaning process is shortened and also possible startup time for the production of coffee is reduced.

The coffee cooler advantageously has at least for the second flow path a length in the range of 1 m and 8 m for a diameter in the range of 1 mm and 4 mm. Advantageously, the coffee cooler is constructed symmetrically such that the first and second flow path have the same length, in particular, preferably the same length and the same diameter. The coffee cooler can be constructed here, for example, as a co-current heat exchanger. Due to the better heat transfer, however, the construction as a countercurrent heat exchanger is especially preferred.

The fresh-water cooler advantageously has a length at least of the first flow path in the range from 3 m to 8 m for an advantageous diameter in the range from 1 mm to 7 mm, in order to guarantee sufficient cooling of the fresh water. The fresh-water cooler is also advantageously constructed as a symmetric heat exchanger, so that both flow paths have the same length and preferably the same diameter. Likewise, the construction as a co-current heat exchanger lies in the scope of the invention, preferably, the fresh-water cooler is constructed as a countercurrent heat exchanger.

Likewise, however, the construction of the fresh-water cooler and/or coffee cooler in other previously known structures of heat exchangers also lies in the scope of the invention.

Advantageously, cleaning of the device is performed such that fresh water and/or cleaning agents pass at least through the brewing unit and further downstream the second flow path of the coffee cooler. Starting from here, the fluid flows via the cleaning multi-port directional control valve into the cleaning outlet. Likewise, the fluid can be discharged via the coffee outlet.

Furthermore, it lies in the scope of the invention to perform cleaning by means of blowing with compressed air in addition to or instead of the cleaning fluid.

Additional features and advantageous embodiments of the invention will be explained below with reference to FIG. 1.

FIG. 1 shows the schematic diagram of a device according to the invention that is realized as two units.

The first unit represents a coffeemaker 1. This has a fresh-water supply 2 that can be connected in a fluid-conducting manner via a fresh-water multi-port directional control valve 3 selectively with a brewing unit 4 or with a fresh-water output 5. The brewing unit 4 is constructed in a known way like for coffeemakers and has a coffee outlet 4a that is connected in a fluid-conducting manner downstream with a coffee multi-port directional control valve 6.

By means of the coffee multi-port directional control valve 6, the coffee can be conducted selectively to a coffee outlet 7 or to a coffee output 8. The coffeemaker 1 further has a coffee inlet 9 that is connected in a fluid-conducting manner with the coffee outlet 7.

In addition, the coffeemaker 1 has a second fresh-water supply 2a that is connected in a fluid-conducting manner with the brewing unit 4, while bypassing the fresh-water multi-port directional control valve 3.

The second unit represents a cooling unit 10. This comprises a fresh-water inlet 15 that is connected in a fluid-conducting manner with the fresh-water output 5; a fresh-water output 12a that is connected in a fluid-conducting manner with the second fresh-water supply 2a; a coffee inlet 18 that is connected in a fluid-conducting manner to the coffee output 8; and a coffee output 19 that is connected in a fluid-conducting manner to the coffee input 9.

The cooling unit 10 further comprises a refrigerant assembly 11, a fresh-water cooler 13 constructed as a heat exchanger, a coffee cooler 14 likewise constructed as a heat exchanger, and a cleaning multi-port directional control valve 16.

Starting from the fresh-water input 15, this is connected in a fluid-conducting manner downstream with a second flow path of the fresh-water cooler 13, further downstream with a first flow path of the coffee cooler 14, and further downstream with the fresh-water output 12a.

The coffee input 18 is connected in a fluid-conducting manner downstream with the second flow path of the coffee cooler 14 and further downstream with the cleaning multi-port directional control valve 16. By means of the cleaning multi-port directional control valve 16, the coffee can be fed selectively to the coffee output 19 or to a cleaning outlet 17, wherein the cleaning outlet 17 opens into a drain.

Fresh-water multi-port directional control valve 3, coffee multi-port directional control valve 6, and cleaning multi-port directional control valve 16 are each constructed as 3/2 valves that can be controlled by means of a control unit.

The coffeemaker 1 further has a not-shown control unit that controls both the components of the coffeemaker 1 and also, by means of a control interface, the components of the cooling unit 10.

If the user selects, for example, hot coffee, then the fresh-water supply 2 is connected to the brewing unit 4 while bypassing the cooling unit and this is connected in a fluid-conducting manner with the coffee outlet 7 while bypassing the cooling unit. Then, in a known way, by feeding fresh water to the brewing unit, coffee is produced and output from the coffee outlet.

In contrast, if the user selects cooled coffee, then the fresh-water supply 2 is connected in a fluid-conducting manner with the cooling unit 7 via the fresh-water multi-port directional control valve 3 and the coffee outlet 7 via the coffee multi-port directional control valve 6. Fresh water thus flows from the fresh-water inlet via the fresh-water output 5 and fresh-water input 15 through the second control path of the fresh-water cooler 13. The refrigeration assembly 11 is connected in a fluid-conducting manner via a coolant circuit with the first flow path of the fresh-water cooler 13, so that fresh water has a temperature of approximately 2° C. after passing through the fresh-water cooler. Then the fresh water flows through the first flow path of the coffee cooler 14 and after flowing through this via the fresh-water output 12a and the second fresh-water supply 2a it is fed to the brewing unit 4. This produces coffee from the fresh water in a known way and outputs this via the coffee outlet 4a, wherein the coffee is conducted via the coffee multi-port directional control valve 6, the coffee output 8, and the coffee input 18 through the second flow path of the coffee cooler 14. After passing through this, the coffee is initially fed via the cleaning multi-port directional control valve 16 into the cleaning outlet 17. This is necessary, however, only for a time period in the range of 5 s to 15 s, in order to eliminate possible residue of cleaning agents and to achieve correct functioning of the cooling. Then the coffee is forwarded via the cleaning multi-port directional control valve 17, the coffee output 19, and the coffee inlet 9 to the coffee outlet 7, so that cooled coffee is discharged.

The invention claimed is:
1. A device for production of coffee that is cooled below a brewing unit outlet temperature, comprising:
   a brewing unit for production of the coffee, a cooling assembly and a coffee cooler formed as a heat exchanger, the coffee cooler having only a single cooling stage, and has at least one first and one second flow path that are connected thermally but not in a fluid-conducting manner, a coolant can flow through the first flow path and the second flow path is connected in a fluid-conducting manner with a coffee outlet of the brewing unit,
   a fresh-water supply and a fresh-water cooler formed as an additional heat exchanger, the fresh-water cooler has at least one first and one second flow path that are connected thermally, but not in a fluid-conducting manner, and
   the fresh-water supply is connected in a fluid-conducting manner downstream with the second flow path of the fresh-water cooler so that fresh water is cooled by the fresh-water cooler, the second flow path of the fresh-water cooler is connected in a fluid-conducting manner further downstream with the first flow path of the coffee cooler so that, with respect to the coffee cooler, the fresh water having been cooled by the fresh water cooler acts as a coolant in the single cooling stage and
   the first flow path of the coffee cooler is connected in a fluid-conducting manner further downstream with the brewing unit so that the fresh water, which is heated, due to heat transfer with the coffee cooled in the coffee cooler, is fed to the brewing unit, in order to produce the coffee via brewing, and
   the first flow path of the fresh-water cooler is connected in a fluid-conducting manner with a coolant circuit of the cooling assembly.

2. The device according to claim 1, wherein the fresh-water cooler and cooling assembly are constructed so that the fresh water can be cooled after flowing through the fresh-water cooler to a temperature below 7° C. for an outlet temperature of the fresh water in the range between 15° C. and 30° C.

3. The device according to claim 1, wherein the cooling assembly and fresh-water cooler are constructed so that the fresh-water cooler has an evaporation temperature greater than 0° C.

4. The device according to claim 1, further comprising a thermal buffer element is arranged between the first and second flow paths.

5. The device according to claim 1, wherein the device further comprises a cleaning multi-port directional control valve that can be connected in a fluid-conducting manner at least to one coffee outlet and one cleaning outlet, the coffee outlet of the brewing unit is connected downstream with the second flow path of the coffee cooler and further downstream with the cleaning multi-port directional control valve, so that fluid can be output selectively downstream of the second flow path of the coffee cooler via the coffee outlet or via the cleaning outlet.

6. The device according to claim 1, wherein the device further comprises a fresh-water multi-port directional control valve arranged between the fresh-water supply and the second flow path of the fresh-water cooler, so that the fresh-water supply can be connected in a fluid-conducting manner selectively with the second flow path of the fresh-water cooler or can be connected in a fluid-conducting manner with the brewing unit while bypassing the second flow path of the fresh-water cooler and while bypassing the first flow path of the coffee cooler.

7. The device according to claim 1, wherein the device further comprises a coffee multi-port directional control valve that is arranged between the coffee outlet of the brewing unit and the second flow path of the coffee cooler, so that the coffee outlet of the brewing unit can be connected in a fluid-conducting manner selectively with the second flow path of the coffee cooler or can be connected in a fluid-conducting manner with a coffee outlet while bypassing the second flow path of the coffee cooler.

8. The device according claim 1, wherein the device further comprises a cooling chamber for cooling a fluid foodstuff, the coolant circuit of the cooling assembly is connected thermally with the cooling chamber and is constructed such that, by use of the coolant, both the cooling chamber and also the first flow path of the fresh-water cooler can be cooled.

9. The device according to claim 8, wherein the coolant circuit of the cooling assembly is connected in a fluid-conducting manner with at least first and second evaporators, and, starting from a compressor, the coolant circuit is connected in a fluid-conducting manner downstream with a condenser, further downstream with the first evaporator for cooling the cooling chamber, and further downstream with the first flow path of the fresh-water cooler as the second evaporator, and at least one of the first evaporator has an evaporation temperature below 0° C. or the second evaporator has an evaporation temperature above 0° C.

10. Method for the production of cooled coffee, comprising:
    producing hot coffee in a brewing unit,
    cooling the hot coffee using a coffee cooler constructed as a heat exchanger, the coffee cooler having only a single cooling stage and a cooling assembly,
    cooling fresh water using the cooling assembly,
    conducting the cooled fresh water through a first flow path of the coffee cooler and conducting the coffee through a second flow path of the coffee cooler, wherein the first and second flow path are connected thermally, but not in a fluid-conducting manner, and
    conducting the fresh water, having been heated due to heat transfer with the coffee cooled in the coffee cooler is fed, downstream of the coffee cooler, to the brewing unit for the production of coffee.

11. The method according to claim 10, further comprising cooling the fresh water using a fresh-water cooler constructed as an additional heat exchanger, wherein a coolant circuit is realized between the cooling assembly and a first flow path of the fresh-water cooler and downstream of a fresh-water supply, the fresh water is conducted through a second flow path of the fresh-water cooler, wherein the first and second flow paths are connected thermally, but not in a fluid-conducting manner.

12. The method according to claim 11, further comprising cooling the fresh water after flowing through the fresh-water cooler to a temperature below 7° C. for an output temperature of the fresh water at least at 15° C.

13. The method according to claim 10, wherein for cleaning, connecting the second flow path of the coffee cooler in a fluid-conducting manner to a cleaning outlet and for output of coffee, connecting the second flow path of the coffee cooler in a fluid-conducting manner to a coffee outlet.

14. The method according to claim 13, wherein for the coffee output, initially for a predetermined time period, connecting the second flow path of the coffee cooler in a fluid-conducting manner with a cleaning outlet and then with a coffee outlet.

15. The method according to claim 14, wherein for output of coffee at a brewing unit output temperature, at least one of conducting the fresh water to the brewing unit while bypassing the second flow path of the fresh-water cooler and while bypassing the first flow path of the coffee cooler or conducting the coffee to the coffee outlet starting from the brewing unit while bypassing the second flow path of the coffee cooler.

* * * * *